United States Patent
Abou Akar et al.

(10) Patent No.: US 7,250,702 B2
(45) Date of Patent: Jul. 31, 2007

(54) ROTARY ELECTRIC MACHINE COMPRISING A STATOR AND TWO ROTORS

(75) Inventors: Atef Abou Akar, L'Isle d'Espagnac (FR); Eric Coupart, Angouleme (FR); Jacques Saint-Michel, Angouleme (FR)

(73) Assignee: Moteurs Leroy-Somer, Angouleme (FR)

( * ) Notice: Subject to any disclaimer, the term of this patent is extended or adjusted under 35 U.S.C. 154(b) by 0 days.

(21) Appl. No.: 10/546,841

(22) PCT Filed: Mar. 5, 2004

(86) PCT No.: PCT/FR2004/000530

§ 371 (c)(1),
(2), (4) Date: Nov. 2, 2005

(87) PCT Pub. No.: WO2004/082100

PCT Pub. Date: Sep. 23, 2004

(65) Prior Publication Data

US 2006/0175923 A1    Aug. 10, 2006

(30) Foreign Application Priority Data

Mar. 6, 2003    (FR)    ................... 03 02776

(51) Int. Cl.
  *H02K 16/02* (2006.01)
  *H02K 1/27* (2006.01)
  *H02K 21/22* (2006.01)

(52) U.S. Cl. ............ 310/114; 310/156.41; 310/156.48; 310/156.55; 310/216; 310/218

(58) Field of Classification Search ................ 310/216, 310/218, 254, 261, 156.08, 156.38, 156.41, 310/156.48, 156.53, 162, 112, 114, 156.55
See application file for complete search history.

(56) References Cited

U.S. PATENT DOCUMENTS

| | | | |
|---|---|---|---|
| 3,914,859 A * | 10/1975 | Pierson .......................... 29/596 |
| 4,227,105 A | 10/1980 | Kumakura | |
| 6,002,192 A * | 12/1999 | Krivospitski et al. ........ 310/266 |
| 6,323,572 B1 * | 11/2001 | Kinoshita .............. 310/156.07 |
| 6,590,312 B1 * | 7/2003 | Seguchi et al. ............. 310/266 |
| 6,611,076 B2 * | 8/2003 | Lindbery et al. ........... 310/216 |
| 6,700,288 B2 * | 3/2004 | Smith ......................... 310/218 |
| 6,727,632 B2 * | 4/2004 | Kusase ....................... 310/266 |
| 6,774,591 B2 * | 8/2004 | Arimitsu et al. ............. 318/154 |
| 2002/0047418 A1 * | 4/2002 | Seguchi et al. ............. 310/114 |
| 2002/0047425 A1 | 4/2002 | Coupart et al. | |

(Continued)

FOREIGN PATENT DOCUMENTS

EP    1 003 267 A2    5/2000

(Continued)

*Primary Examiner*—Tran Nguyen
(74) *Attorney, Agent, or Firm*—Oliff & Berridge, PLC

(57) ABSTRACT

The invention relates to an electric machine comprising a stator (10, 40) provided with a plurality of teeth (11, 41), each tooth supporting at lest one individual coil (13, 46, 47), an external rotor (30) which is radially arranged outside the stator and provided with constant magnets, an internal rotor (20) radially arranged inside the stator, provided with constant magnets and connected to the external rotor (30). At least one of the external (30) and internal (20) rotors is disposed in a flux concentration.

31 Claims, 5 Drawing Sheets

U.S. PATENT DOCUMENTS

2002/0171305 A1 11/2002 Coupart et al.

FOREIGN PATENT DOCUMENTS

| EP | 1 102 385 A2 | 5/2001 |
| EP | 1 249 919 A1 | 10/2002 |
| EP | 1 251 023 A1 | 10/2002 |
| FR | 2 653 274 | 4/1991 |
| WO | WO 91/06147 | 5/1991 |

* cited by examiner

ROTARY ELECTRIC MACHINE COMPRISING A STATOR AND TWO ROTORS

BACKGROUND OF THE INVENTION

The present invention relates to electrical machines and more particularly to those having a stator, an outer rotor and an inner rotor fastened to the outer rotor.

A machine with two concentric rotors is described in International Application WO 91/06147. The stator has teeth provided at their ends with pole shoes. The coils have heads onto which a heat-transfer fluid, such as oil, is sprayed so as to remove the heat from the windings. Such a machine is relatively complicated to manufacture.

The electric motor described in Application WO 91/06147 is also relatively long in the axial direction, especially because of the coil heads and the means of cooling them.

BRIEF SUMMARY OF THE INVENTION

There is a need to benefit from a machine of simplified construction and reliable operation without the necessity of cooling the coils by spraying a heat-transfer fluid onto them.

There is also a need to have a compact machine capable of operating with a high torque and/or at high speed.

The subject of the invention, according to one of its aspects, is an electrical machine comprising:

a stator comprising a plurality of teeth, each supporting at least one individual coil;

an outer rotor placed radially on the outside of the stator and comprising permanent magnets; and an inner rotor placed radially on the inside of the stator, comprising permanent magnets and being fastened to the outer rotor.

Thanks to the use of individual coils associated with the teeth of the stator rather than distributed windings, the construction of the machine is simplified and its reliability is thereby increased.

The presence of the outer and inner rotors makes it possible to virtually double the torque for the same volume, compared with a motor having a single rotor.

Likewise, the stator does not have a fixed yoke which serves electrically only to close the magnetic flux path and is a source of considerable iron losses. Its omission therefore results in the elimination of these losses and in considerable improvement in efficiency, particularly at high speed.

Preferably, at least one of the outer rotor and the inner rotor is a flux-concentrating rotor, and preferably both rotors are flux-concentrating rotors, that is to say two consecutive magnets of a rotor have faces of the same polarity that are placed so as to face a common adjacent pole piece placed between said magnets. This may allow the number of magnets used to be reduced without thereby degrading the performance of the machine. This may also allow the machine to operate at a high rotation speed, the magnets of the inner rotor being able to be retained by the pole pieces, if required.

The two rotors have the same number of poles and the two rotors may or may not be angularly offset.

In embodiments in which the rotors are angularly offset, when the number of phases m is even, the two rotors are advantageously offset by an angle of approximately $\pi/S$, for example to within 10%, where $S=mp$, S being the number of teeth of the stator and p being the number of pairs of poles of a rotor, and when m is odd, the two rotors are advantageously offset by an angle $\alpha$ of approximately $\pi/2S$, for example to within 10%.

The outer rotor may have pole pieces each having at least one recess on the radially outer side. This may allow the rotor to be lightened without thereby unduly reducing the efficiency of the machine, the magnetic flux lines being particularly concentrated on the radially internal side of the pole pieces of the outer rotor. The pole pieces of the outer rotor may for example pass through a minimum cross section at mid-length along the circumferential direction.

The magnets of at least one of the inner rotor and the outer rotor may have a wedge shape when observed along the axis of rotation of the machine, its width increasing upon moving away from the stator. Such a shape of the magnets allows retention by the pole pieces at a high rotation speed of the rotor, without it being necessary, for example, to cement the magnets.

In one particular embodiment, the inner rotor has pole pieces linked through shape complementarity to a shaft of the machine. For example, the pole pieces of the inner rotor may have slots and may be engaged via these slots on ribs of the shaft. Such an arrangement may make it easier to construct the rotor and especially to avoid having to produce pole pieces with apertures for engaging rods independent of the machine's shaft, for example, into them.

Again, according to one particular embodiment, at least one of the rotors may have pole pieces placed between the permanent magnets and each having, on their side turned toward the stator, a convex domed face turned toward the stator. Such a shape of the pole pieces makes it possible to minimize the difference $L_d-L_q$, and therefore avoids having to use the reluctance in order to generate the motive force, and makes it possible to reduce torque ripple.

In one particular embodiment, the stator having $n_{teeth}$ teeth, each of the rotors having $n_{pairs}$ pairs of poles and the current having $n_{phases}$ phases, the number $n_{teeth}$ of teeth of the stator may be chosen according to the relationship; $n_{teeth}=n_{pairs} \times n_{phases}$. When this relationship is met, it is possible for the stator not to be subjected to stresses that tend to ovalize it.

In another particular embodiment, the stator may have 6n teeth and each of the rotors may have 6n±2 poles, n being greater than or equal to 2. This makes it possible to have a high winding factor, reflecting the efficiency of use of the windings, and thus the machine is more efficient and more compact.

In one particular embodiment, the teeth of the stator may each have a free first end located facing one of the rotors. The teeth may be fastened via a second end, opposite the first end, to to a nonmagnetic support. The support may for example be made of nonmagnetic steel or of aluminum or even an insulating material.

Such a configuration is most particularly suitable when each tooth of the stator serves as a core for a winding, by supporting a single individual coil. This is referred to as a "concentrated winding".

As a variant, the teeth of the stator may each have two opposed free ends facing the inner and outer rotors, respectively.

The teeth may be held in place, for example at approximately mid-length by a nonmagnetic support. This support may be of tubular general shape. Such an arrangement is most particularly suitable when each of the teeth of the stator has two individual coils, which are not electrically together, so as to have a stator comprising two independent electrical circuits, where appropriate.

The stator may as a variant have a yoke made as a single part with the teeth. The yoke may be made of a magnetic material.

Preferably, the teeth of the stator are devoid of pole shoes, thereby allowing the individual coils to be fastened by engaging them on the teeth, the coils being produced separately.

As a variant, the teeth of the stator may have pole shoes.

The teeth of the stator may have notches near their free end facing one of the rotors. The coils may be held in place on the teeth by nonmagnetic blocks engaged in these notches.

The outer rotor may be surrounded by a casing, for example made of nonmagnetic steel or aluminum, which may be fastened onto the shaft of the machine, which is made for example of aluminum.

For machines having a relatively large axial dimension, it may prove desirable to duplicate the structure so as to reduce the cantilevered length of the stator and the rotors.

The stator may thus have a double structure, as may the inner rotor or the outer rotor.

The machine may constitute a synchronous motor or a generator, or even both in succession, and it may be used for example in an electric vehicle for driving the wheels and for recovering energy when braking.

BRIEF DESCRIPTION OF THE DRAWINGS

The invention will be more clearly understood on reading the detailed description that follows of non limiting illustrative examples thereof and on examining the appended drawing in which.

DETAILED DESCRIPTION OF EXEMPLARY EMBODIMENTS

Figure 1:
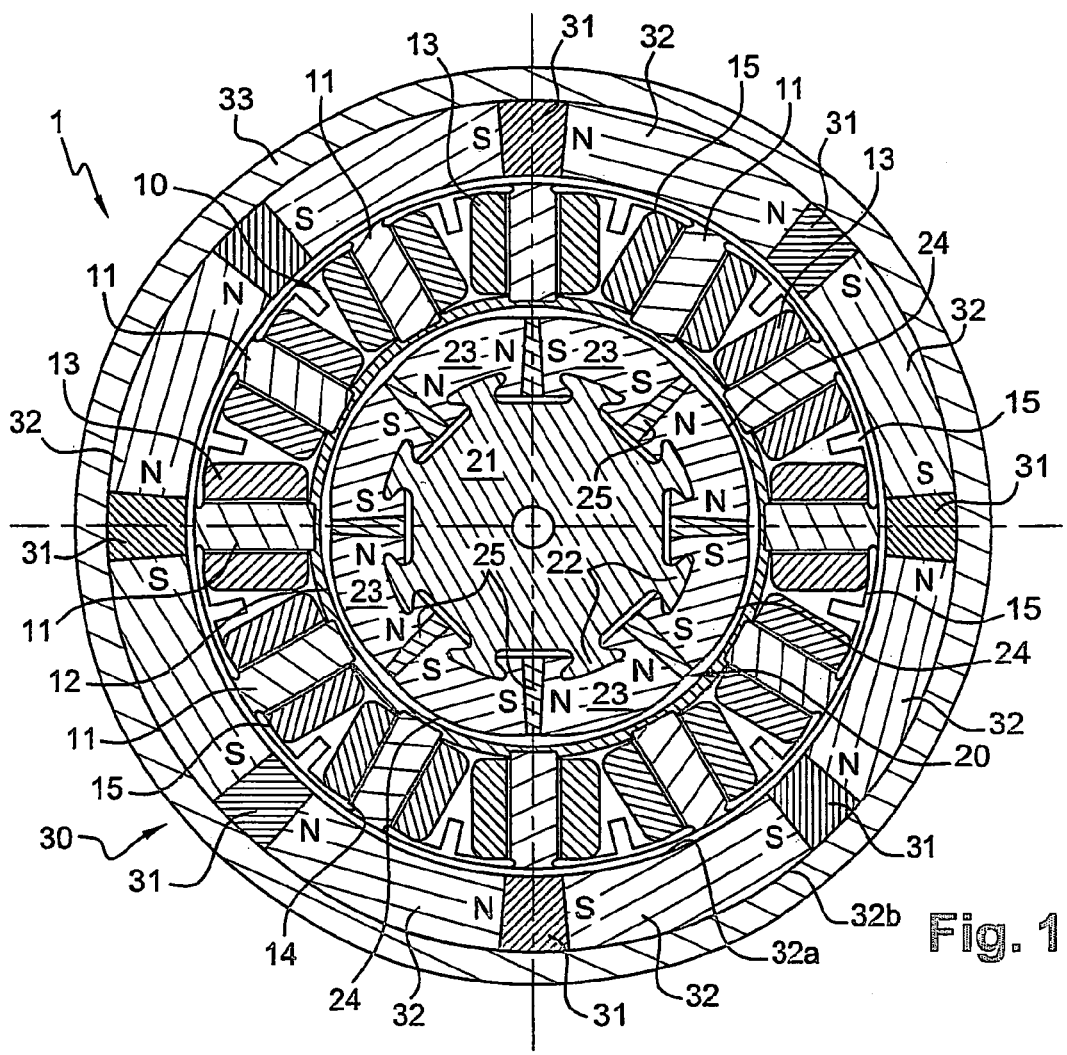
FIG. 1 is a schematic cross-sectional view of one example of a machine according to the invention.
Figure 2:
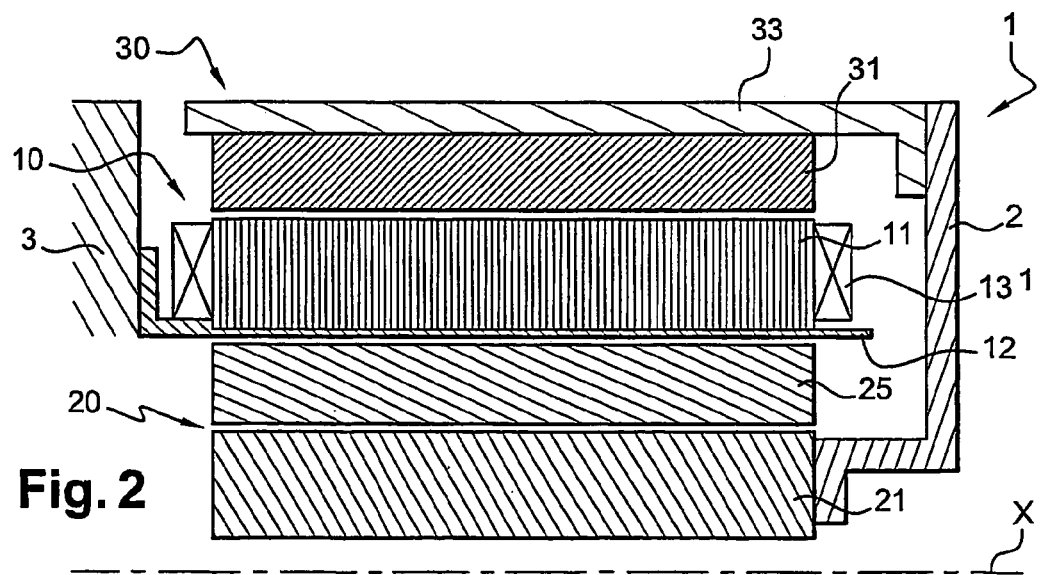
FIG. 2 is a partial schematic view in axial section of the machine of FIG. 1.

The electrical machine 1 shown in FIGS. 1 and 2 comprises a stator 10, an inner rotor 20 and an outer rotor 30 that are fastened together by a mechanical linkage 2 between them.

The stator 10 has a plurality of teeth 11 formed by a stack of magnetic laminations electrically isolated from one another, these teeth being fastened to a support piece 12 made of a nonmagnetic material, for example a nonmagnetic steel or aluminum, or made of an insulating material.

The support piece 12 is fastened, in the example described, to a frame 3 of the machine, as shown schematically in FIG. 2.

In the example in question, the teeth 11 are fastened via their radially innermost end to the support piece 12, which has a generally tubular shape. The teeth 11 may be fastened by any means to the support piece 12, for example they may be welded thereto.

Each tooth 11 carries an individual coil 13, which comprises one or more electrical conductors wound around the axis of the corresponding tooth.

The coils 13 are connected to electrical conductors (not visible). A conventional device makes it possible, when the machine is used as a motor, to generate a rotating magnetic field and, when the machine is used as a generator, to collect the induced current.

The coils 13 may for example be connected to partially stripped cables, as described in Patent Application EP-A-1 251 623.

The teeth 11 are, as may be seen, devoid of pole shoes at their radially outer end, so as to allow the coils 13 manufactured beforehand to be put into place.

The teeth 11 may have parallel or nonparallel lateral faces, especially faces that diverge on moving away from the outer rotor 30, so as for example to allow a certain amount of blocking of the coils 13 on the teeth, as described in the aforementioned Patent Application EP-A-1 251 623.

The teeth may each have, in the vicinity of their free end, two small notches 14 so as for example to allow the coil-retaining blocks 15 to be fastened onto the teeth. These blocks 15 may be made of an insulating material, for example a plastic.

The inner rotor 20 has a nonmagnetic shaft 21, for example made of aluminum or an alloy of this metal, made of nonmagnetic steel or made of a composite.

The shaft 21 has ribs 22 serving for catching pole pieces 23, each consisting of a packet of superposed identical magnetic laminations. The use of superposed magnetic laminations helps to reduce the induced current losses. Each rib 22 has a cross section in the general form of a T. The pole pieces 23 are not magnetically connected together, owing to the use of a nonmagnetic material to produce the shaft.

In the example in question, the pole pieces 23 have a convex domed face 24 turned toward the stator 10.

Permanent magnets 25 are placed radially between the pole pieces 23. Each magnet 25 has, when observed along the axis of rotation X of the machine, a slightly tapered shape, its width decreasing toward the stator 10.

Each magnet 25 has a transverse magnetization and may be a one-piece magnet or may consist of several individual magnets place end to end.

The magnetic poles of the same polarity of two adjacent magnets 25 are directed toward the pole piece 23 lying between these two magnets, as illustrated in FIG. 1. In the example shown, the magnets 25 extend over practically the entire radial dimension of the sides of the pole pieces 23 and in contact with them.

The housings formed between the pole pieces 23, in which the magnets 25 are placed, tend to widen under the effect of the centrifugal force when the inner rotor 20 is rotated at a speed greater than a predetermined speed, owing to the elasticity of the materials used. This widening tends to decrease when the rotation speed decreases.

In general, the inner rotor 20 may be similar to the rotor described in Patent Application EP-A-1 249 919.

The outer rotor 30 has permanent magnets 31 placed between pole pieces 32, the rotor being surrounded by a nonmagnetic casing 33, for example as described in Patent Application EP-A-1 251 023.

In the example described, the magnets 31 have a wedge shape when observed along the axis of rotation X of the machine, its width increasing upon moving away from the stator.

In the example in question, the poles of the two rotors are not angularly offset. Two consecutive magnets 25, 31 of the outer 30 and inner 20 rotors have faces of the same polarity that are placed so as to face a common adjacent pole piece 23, 32 placed between said magnets. Two pole pieces 23, 32 of each of the inner 20 and outer 30 rotors, located on any one radius, are of opposite N, S polarity.

In the example shown in FIGS. 1 and 2, the stator 10 has twelve teeth 11 and twelve coils 13, while each of the rotors has eight poles, but the number of teeth or the number of poles may be different without thereby departing from the scope of the present invention.

Again in the example shown in these figures, the pole pieces 32 of the outer rotor 30 have radially internal faces 32a and radially external faces 32b that are cylindrical.

It would not be outside the scope of the present invention if the pole pieces were to have a different shape.

Figure 3:
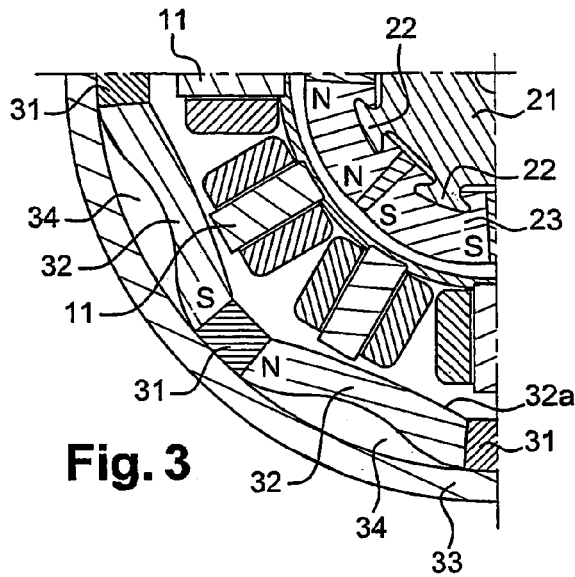
FIGS. 3 to 6 are partial views similar to FIG. 1 of alternative embodiments of the invention.

The pole pieces of the outer rotor may for example have a convex, domed, radially internal face turned toward the stator, as shown in FIG. 3.

The outer rotor 30 may have pole pieces each having at least one recess on their radially external side.

As an example, FIG. 3 shows an outer rotor having recesses 34 between each of the pole pieces 32 and the nonmagnetic casing 33. In this example, the pole pieces 32 of the outer rotor 30 each pass through a minimum cross section at mid-length along the circumferential direction.

Of course, it would also be possible for the outer rotor 30 not to have recesses 34 and for the pole pieces 32 not to have convex domed faces 32a turned toward the stator, without thereby departing from the scope of the present invention.

In the examples shown in the FIGS. 1 to 3, the permanent magnets 25 and 31 of the inner 20 and outer 30 rotors are of trapezoidal general shape. It would not be outside the scope of the present invention if the shape of the magnets were to be different.

Figure 4:
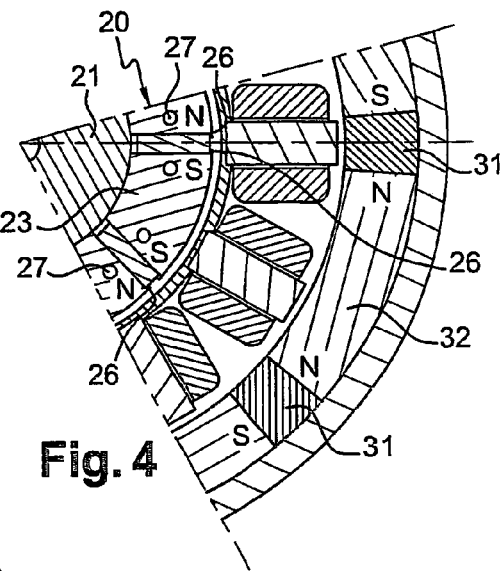

By way of example, FIG. 4 shows part of a machine having permanent magnets of parallelepipedal general shape. It would not be outside the scope of the present invention if the magnets of only one of the two rotors were to be trapezoidal and the magnets of the other rotor were to be parallelepipedal. The pole pieces 23 of the inner rotor 20 may then have shoulders 26 for the retention of the magnets between two successive pole pieces.

The inner rotor 20 that has just been described with reference to FIGS. 1 to 3 has pole pieces 23 fastened by shape complementarity onto ribs 22 of the shaft 21. It would not be outside the scope of the present invention if the pole pieces 23 were to be fastened in another manner to the shaft 21.

The pole pieces 23 shown in FIG. 4 are fastened by rods 27 that pass through the pole pieces and they are connected at each of their ends to retaining flanges (not shown). The shaft 21 is in this example of cylindrical general shape.

In the examples that have just been described, the poles of the inner and outer rotors are not angularly offset.

Figure 5:
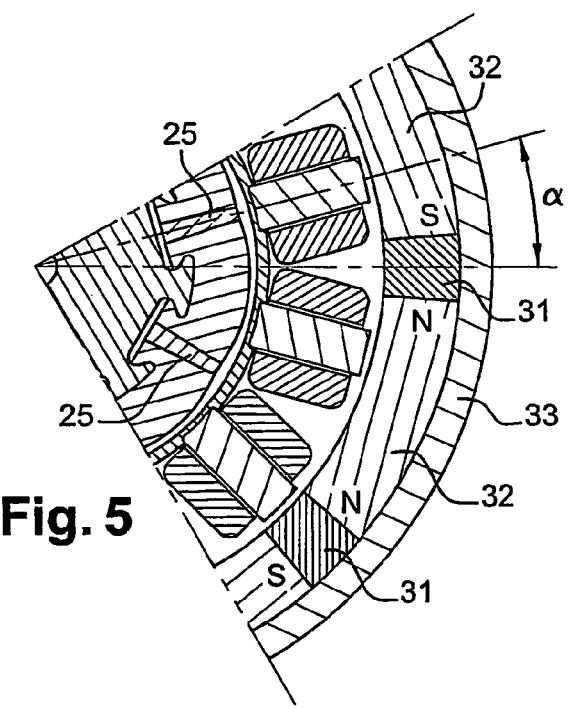

It would not be outside the scope of the resent invention if the poles of the two rotors were to be angularly offset, as shown by way of example in FIG. 5. In this figure, the poles are offset by an angle α, which has been intentionally exaggerated for the sake of clarity of the drawing.

When the number of phases m is even, the two rotors may be offset by an angle α of approximately $\pi/S$, where $S=mp$, S being the number of teeth of the stator, p being the number of pairs of poles of a rotor, and when m is odd, the two rotors may be offset by an angle α of approximately $\pi/2S$. Such an offset makes it possible to reduce, or even eliminate, torque ripple.

In the examples that have just been described, the number of teeth $n_{teeth}$ of the stator is equal to 12, the number of poles of each of the rotors is equal to 8, with the number of pairs of poles $n_{pairs}$ being equal to 4 and the number of phases being equal to 3, thus satisfying the relationship $n_{teeth}=n_{phases} \times n_{pairs}$.

It would not be outside the scope of the present invention if the number of teeth of the stator or the number of poles of each of the rotors were to be different.

Figure 6:
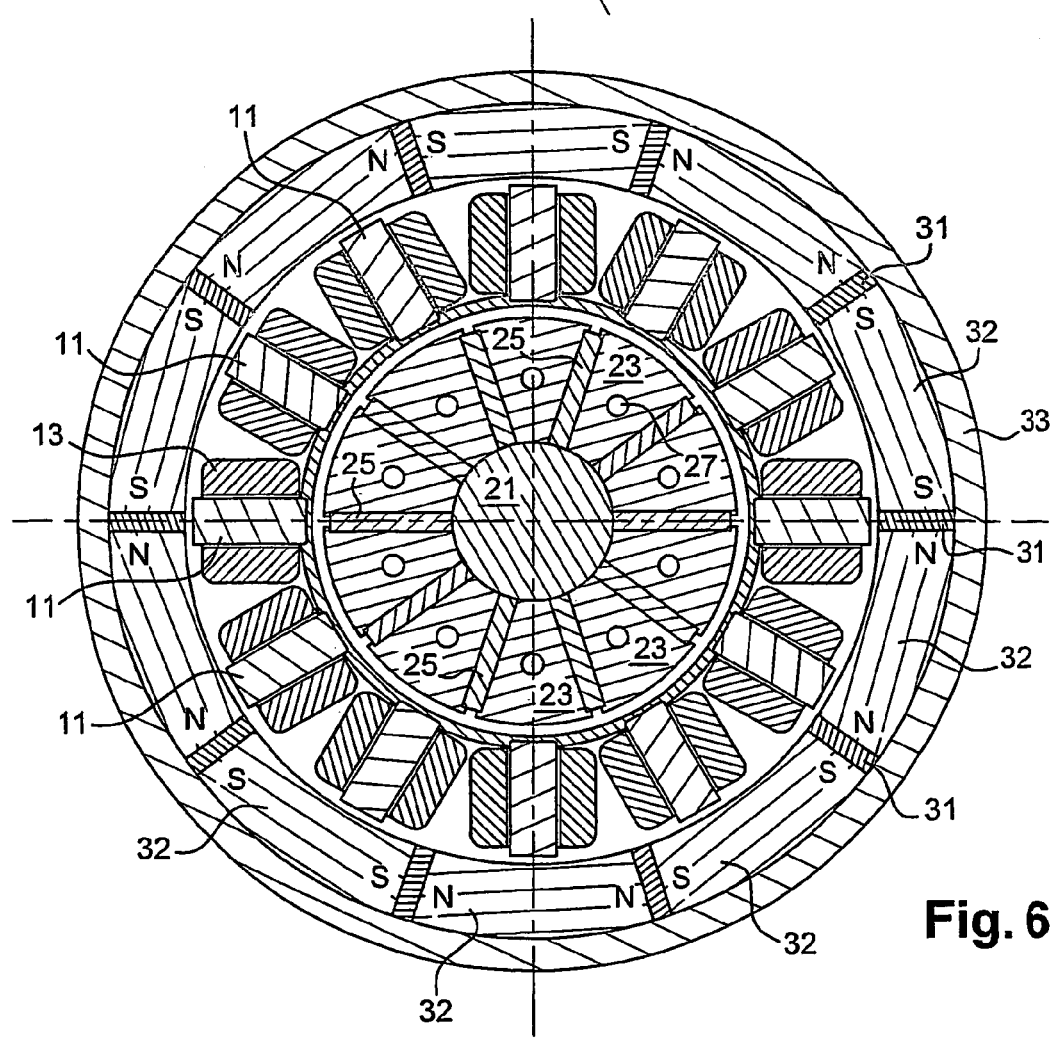

As an example, FIG. 6 shows a machine having twelve teeth and ten poles at each of the rotors. The stator thus has 6n teeth and each of the rotors has 6n±2 poles, n being equal to 2 in this example, but it would not be outside the scope of the present invention if n were to be greater than 2.

In the examples that have just been described, each of the teeth of the stator carries a single individual coil, but it would not be outside the scope of the present invention if each of the teeth of the stator were to carry more than one, and especially two, individual coils.

Figure 7:
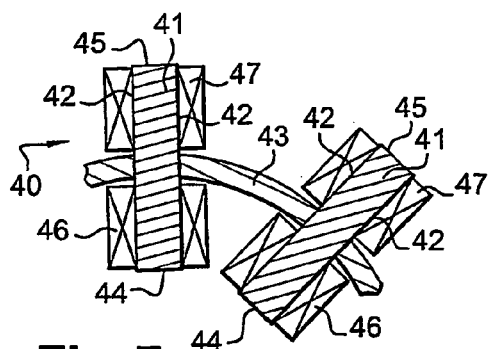
FIG. 7 is a partial schematic view in cross section of one embodiment of the stator.

By way of example, FIG. 7 shows, schematically and partially, a stator 40 having teeth 41 that are held in place substantially at mid-length along their radial edges 42 by a nonmagnetic support 43 or a support made of insulating material, or else a combination of the two, said support having an annular shape closed on one or both sides. As a variant, the support 43 may be magnetic.

The teeth 41 have free ends 44 and 45 facing the inner rotor 20 and the outer rotor 30 respectively, each tooth being devoid of a pole shoe.

Coils 46 and 47 are placed respectively on either side of the support 43 on each tooth 41 in order to create a rotating magnetic field in the inner and outer rotors respectively, or to recover the current induced by the inner and outer rotors.

In the example shown in FIG. 7, the edges 42 of each tooth 41 are parallel, but the teeth 41 could, where appropriate, have nonparallel edges 42, the teeth 41 widening for example toward the support 43 so that the coils 46 and 47 can be engaged on the teeth 41 with a slight clamping effect.

The teeth 41 could also have, at each of their free ends 44, 45, two small notches intended for the fastening, onto the teeth, of coil-retaining blocks on the teeth, in a manner similar to that described with reference to FIGS. 1 and 2.

Figure 13:
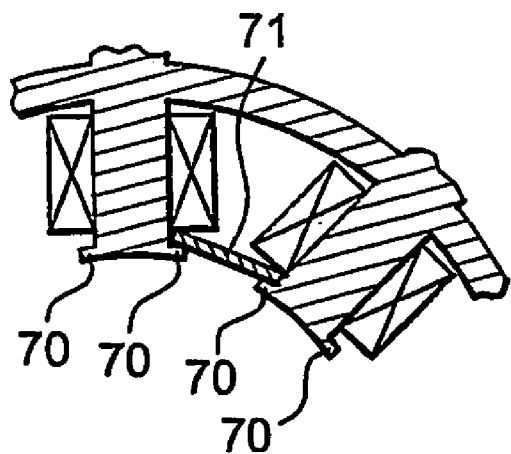
FIGS. 13 and 14 are views similar to FIG. 7 of alternative embodiments of the stator.

In what has just been described, the teeth are devoid of pole shoes, but it would not be outside the scope of the invention if the teeth were to have pole shoes 70, making it possible for example to fasten coil-retaining blocks 71 onto the teeth, as illustrated schematically in FIG. 13.

Figure 8:
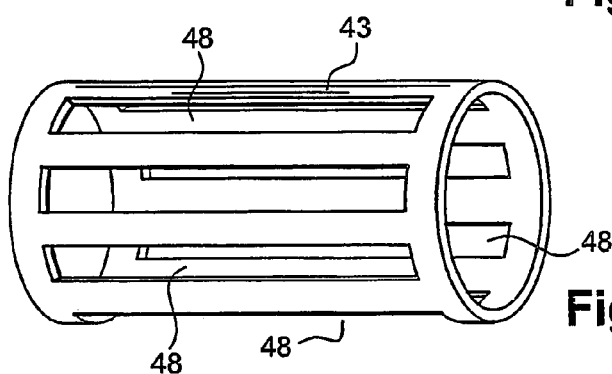
FIG. 8 shows, in isolation, a support piece for the teeth of the stator of FIG. 7.

The support 43 is shown schematically in FIG. 8. It has an annular general shape with openings 48 intended to house the teeth 41.

The teeth 41 may be fastened by any means to the support 43, for example by force-fitting, by welding or by bonding.

It would not be outside the scope of the present invention if the stator were to be produced differently.

Figure 14:
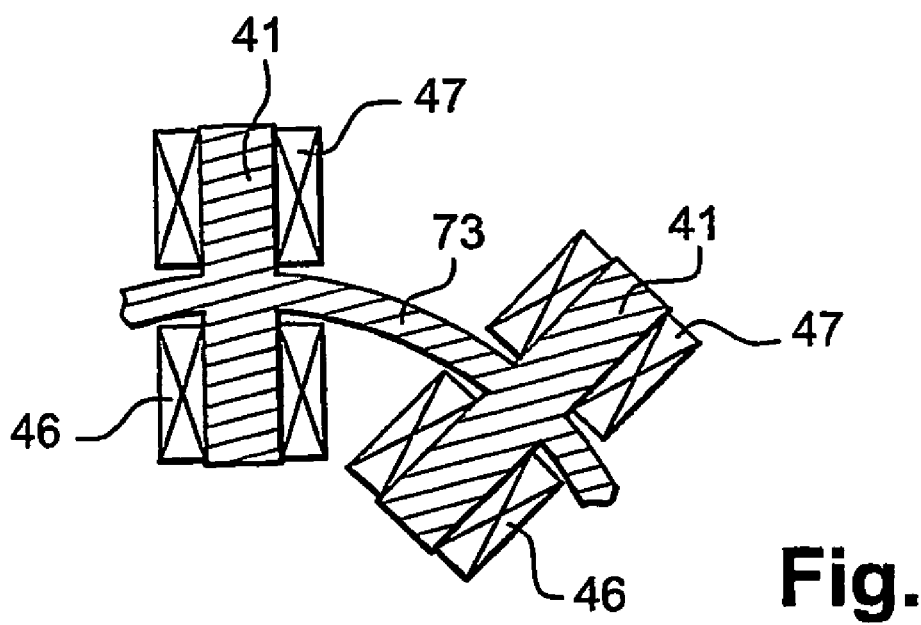

For example, the stator may have coils 46, 47 placed on a yoke 73 made as a single part with the teeth 41, for example made of a magnetic material, as illustrated schematically in FIG. 14. The stator shown in FIG. 14 may for example be produced by molding, or else by the stacking of laminations.

The stator may also be produced differently.

Figure 9:
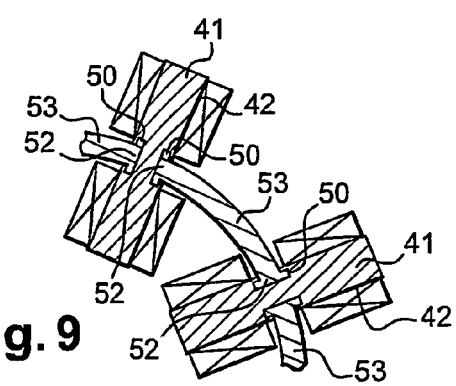
FIG. 9 is a view similar to FIG. 7 of an alternative embodiment of the stator.

As an example, FIG. 9 shows a stator having teeth 41 that include, in the middle of their edges 42, notches 50 capable of housing ends 52 of elements 53 that join the teeth together.

Each of the elements 53 has a curved general shape, being provided at its ends with raised features designed to cooperate with the notches 50 in order for two successive teeth 41 to be firmly held in place.

The elements 53 may be nonmagnetic or, as a variant, magnetic.

The coils carried by any one tooth may be electrically connected together, but it would not be outside the scope of the present invention if the two coils on any one tooth were not to be electrically connected together.

Figure 10:
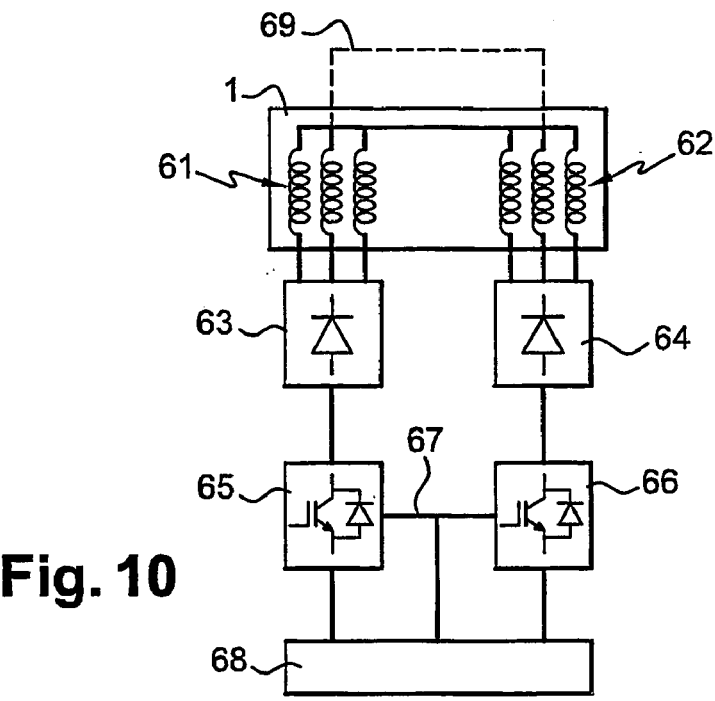
FIG. 10 is a circuit diagram illustrating the possibility of the stator having two independent electrical circuits so as to easily form a neutral point.

In this case, as shown in FIG. 10, the inner and outer coils of the stator may form two independent three-phase electrical circuits 61 and 62 connected, at the output of the machine 1, to respective rectifier circuits 63, 64 and then to rising-edge or falling-edge voltage choppers 65, 66, with the formation of a neutral point 67.

The two electrical circuits 61 and 62 may or may not have a common neutral point 69, shown by the dotted lines, which may or may not be connected to the neutral point 67 of the two rising-edge or falling-edge voltage choppers 65 and 66.

Figure 11:
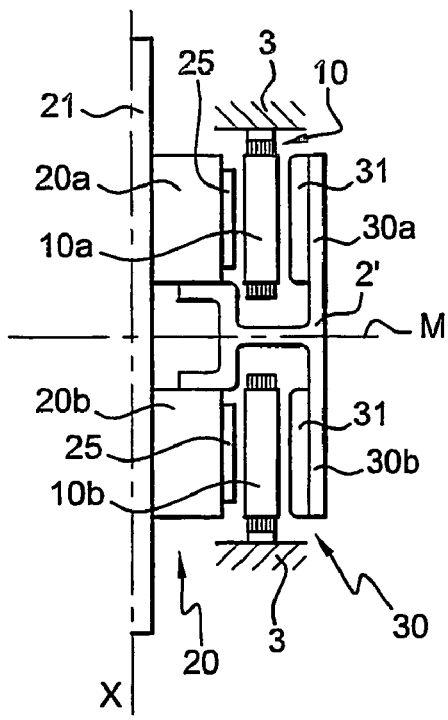
FIGS. 11 and 12 show two examples of alternative embodiments of the invention.
Figure 12:
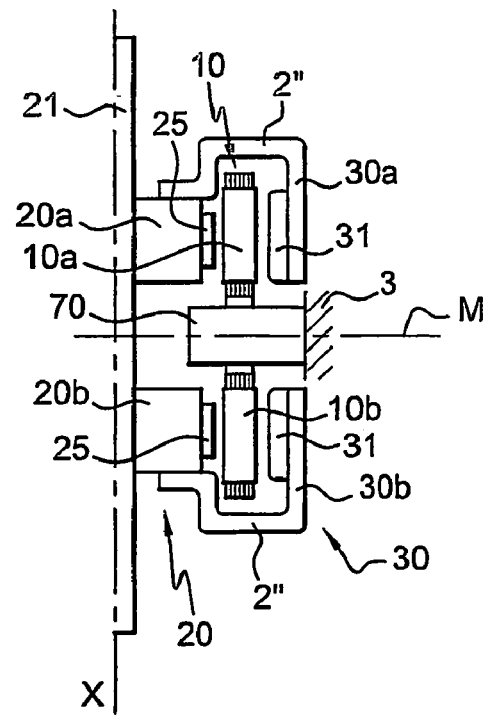

FIGS. 11 and 12 show other possible configurations.

In particular, as illustrated in FIG. 11, the inner rotor 20 may be connected to the outer rotor 30 via a mechanical link 2' that extends radially between two parts 10a and 10b of the stator 10, the latter having a double structure.

Each part 10a or 10b has teeth, each tooth carrying one or two individual coils, in the manner described above, and the inner and outer rotors also each have a double structure, with respective first parts 20a and 30a designed to cooperate with the part 10a of the stator and respective second pats 20b and 30b designed to cooperate with the part 10b of the stator.

In the alterative embodiment shown in FIG. 12, the stator 10 again has a double structure with two parts 10a and 10b, as do the inner and outer rotors.

The parts 10a and 10b of the stator are connected to the frame 3 via a mechanical linkage 70, which is joined to the facing ends of the parts 10a and 10b of the stator. The part 20a of the inner rotor is joined, via a mechanical linkage 2" similar to that shown in FIG. 2, to the part 30a of the outer rotor and the same applies to the other part 20b of the inner rotor, which is connected via a mechanical linkage 2" to the other part 30b of the outer rotor 30.

In the examples shown in FIGS. 11 and 12, the stator and the inner and outer rotors are generally symmetrical with respect to a mid-plane M perpendicular to the axis of rotation X, but this is not necessarily so and it would not be outside the scope of the present invention if double structures were to be produced with unsymmetrical parts.

Of course, the invention is not limited to the examples that have just been described. In particular, the features of the various embodiments described may be combined together.

Throughout the description, including the claims, the expression "having a" must be understood as being synonymous with "having at least one", unless specified to the contrary.

The invention claimed is:

1. An electrical machine comprising:
  a stator comprising a plurality of teeth, each supporting at least one individual coil;
  an outer rotor placed radially on the outside of the stator and comprising permanent magnets; and
  an inner rotor placed radially on the inside of the stator, comprising permanent magnets and being fastened to the outer rotor,
  at least one of the outer rotor and inner rotor being a flux-concentrating rotor, wherein the teeth are fastened onto a nonmagnetic support, and wherein each tooth of the stator supports a single coil or two individual coils.

2. The machine as claimed in claim 1, wherein the teeth of the stator are devoid of pole shoes.

3. The machine as claimed in claim 1, wherein two consecutive magnets of at least one of the outer rotor and the inner rotor have faces of the same polarity that are placed so as to face a common adjacent pole piece placed between said magnets.

4. The machine as claimed in claim 1, wherein the two rotors have the same number of poles.

5. The machine as claimed in claim 4, wherein the poles of the two rotors are not angularly offset.

6. The machine as claimed in claim 4, wherein the poles of the two rotors are angularly offset.

7. An electrical machine comprising:
  a stator comprising a plurality of teeth, each supporting at least one individual coil;
  an outer rotor placed radially on the outside of the stator and comprising permanent magnets; and
  an inner rotor placed radially on the inside of the stator, comprising permanent magnets and being fastened to the outer rotor,
  at least one of the outer rotor and inner rotor being a flux-concentrating rotor,
  wherein when the number of phases m is even, the two rotors are offset by an angle of approximately $\pi/S$, where S=mp, S being the number of teeth of the stator and p being the number of pairs of poles of a rotor, and when m is odd, the two rotors are offset by an angle $\alpha$ of approximately $\pi/2S$.

8. The machine as claimed in claim 1, wherein the outer rotor has pole pieces each having at least one recess on the radially outer side.

9. The machine as claimed in claim 8, wherein the pole pieces of the outer rotor each pass through a minimum cross section at mid-length along the circumferential direction.

10. The machine as claimed in claim 1, wherein the magnets of at least one of the inner rotor and the outer rotor have a wedge shape when observed along the axis of rotation of the machine, its width increasing upon moving away from the stator.

11. The machine as claimed in claim 1, wherein the inner rotor has pole pieces linked through shape complementarity to a shaft of the machine.

12. The machine as claimed in claim 1, wherein the pole pieces of the inner rotor have slots and are engaged via these slots on ribs of the shaft.

13. The machine as claimed in claim 1, wherein at least one of the rotors has pole pieces placed between the permanent magnets and each having, on their side turned toward the stator, a convex domed face turned toward the stator.

14. The machine as claimed in claim 1, the stator having $n_{teeth}$ teeth, each of the rotors having $n_{pairs}$ pairs of poles and the current having $n_{phases}$ phases, characterized in that the number $n_{teeth}$ of teeth of the stator is chosen according to the relationship: $n_{teeth} = n_{pairs} \times n_{phases}$.

15. The machine as claimed in claim 1, wherein the stator has 6n teeth and each of the rotors has 6 n±2 poles, n being greater than or equal to 2.

16. The machine as claimed in claim 1, wherein the teeth of the stator each have a free first end located facing one of the rotors.

17. The machine as claimed in claim 16, wherein the teeth are fastened via a second end, opposite the first end, onto a nonmagnetic support.

18. The machine as claimed in claim 17, wherein each tooth of the stator supports a single individual coil.

19. The machine as claimed in claim 1, wherein the teeth of the stator each have two opposed free ends facing the inner and outer rotors, respectively.

20. The machine as claimed in claim 19, wherein the teeth are held in place at approximately mid-length by a nonmagnetic support.

21. The machine as claimed in claim 19, wherein each of the teeth of the stator has two individual coils.

22. The machine as claimed in claim 21, wherein the two coils carried by any one tooth are not electrically connected together.

23. The machine as claimed in claim 1, wherein the stator has a yoke made as a single part with the teeth.

24. The machine as claimed in claim 23, wherein the yoke is made of a magnetic material.

25. The machine as claimed in claim 1, wherein the teeth have notches near their free end facing one of the rotors.

26. The machine as claimed in claim 1, wherein the teeth of the stator have pole shoes.

27. The machine as claimed in claim 1, having a double structure.

28. The machine as claimed in claim 1, constituting a synchronous motor.

29. The machine as claimed in claim 1, constituting a generator.

30. An electrical machine comprising:

a stator comprising a plurality of teeth devoid of pole shoes and each supporting at least one individual coil;

an outer rotor placed radially on the outside of the stator and comprising permanent magnets; and an inner rotor placed radially on the inside of the stator, comprising permanent magnets and being fastened to the outer rotor, wherein the teeth are fastened onto a nonmagnetic support, and wherein each tooth of the stator supports a single coil or two individual coils.

31. An electrical machine comprising:

a stator comprising a plurality of teeth devoid of pole shoes and each supporting at least one individual coil;

an outer rotor placed radially on the outside of the stator and comprising permanent magnets; and an inner rotor placed radially on the inside of the stator, comprising permanent magnets and being fastened to the outer rotor, wherein when the number of phases m is even, the two rotors are offset by an angle of approximately $\pi/S$, where $S=mp$, S being the number of teeth of the stator and p being the number of pairs of poles of a rotor, and when m is odd, the two rotors are offset by an angle $\alpha$ of approximately $\pi/2S$.

* * * * *